(12) United States Patent
Makuch et al.

(10) Patent No.: US 9,183,072 B1
(45) Date of Patent: Nov. 10, 2015

(54) ERROR TROUBLESHOOTING USING A CORRELATED KNOWLEDGE BASE

(75) Inventors: Jason D. Makuch, Seattle, WA (US); Calvin Y. Kuo, Irvine, CA (US); Michael T. Callahan, Kirkland, WA (US); Zahur A. Peracha, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 370 days.

(21) Appl. No.: 13/596,174

(22) Filed: Aug. 28, 2012

(51) Int. Cl.
*G06F 11/00* (2006.01)
*G06F 11/07* (2006.01)

(52) U.S. Cl.
CPC ........ *G06F 11/0748* (2013.01); *G06F 11/0793* (2013.01)

(58) Field of Classification Search
USPC .......................................................... 714/48
See application file for complete search history.

(56) References Cited

U.S. PATENT DOCUMENTS

| 8,645,756 | B1* | 2/2014 | Lee ................................. 714/26 |
| 2005/0097507 | A1* | 5/2005 | White et al. .................. 717/102 |
| 2007/0283222 | A1* | 12/2007 | Kuo ............................... 714/763 |
| 2008/0065577 | A1* | 3/2008 | Chefalas et al. ................ 706/47 |
| 2008/0294423 | A1* | 11/2008 | Castellani et al. ................ 704/4 |
| 2009/0075635 | A1* | 3/2009 | Russell et al. ............. 455/414.2 |
| 2010/0121977 | A1* | 5/2010 | Kontola et al. ............... 709/232 |
| 2010/0229022 | A1* | 9/2010 | Anand et al. ...................... 714/2 |
| 2010/0229112 | A1* | 9/2010 | Ergan et al. .................... 715/764 |
| 2011/0072312 | A1* | 3/2011 | Fan et al. ......................... 714/46 |
| 2013/0166963 | A1* | 6/2013 | Stoyanov ........................ 714/48 |

* cited by examiner

*Primary Examiner* — Sarai Butler
(74) *Attorney, Agent, or Firm* — Thomas | Horstemeyer, LLP (57) ABSTRACT

Disclosed are various embodiments for an error troubleshooting application. Error data is obtained from a client device. A correlated knowledge base is referenced to determine if a solution is associated with the error data. If a solution is associated with the error data, a notification embodying the solution is communicated to the client device. If a solution is not associated with the error data, a notification indicating the solution is unknown is communicated to the client device.

23 Claims, 5 Drawing Sheets

ERROR TROUBLESHOOTING USING A CORRELATED KNOWLEDGE BASE

BACKGROUND

Error reporting functionality allows developers and manufacturers to receive error data from clients. Problems arise when attempting to provide a solution for the error to the client.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Error reporting functionality allows for developers or manufacturers to receive data from clients when a device or application experiences an error. This is often implemented in a one-way system: clients can report errors, but they do not receive a solution to the error in return. Such one-way systems may make a client reluctant to send error data to the developer and manufacturer because they have no incentive to do so. Additionally, developers or manufacturers who receive this error data may end up with many discreet instances of error data, but commonalities or relationships between the discreet instances may not be readily apparent.

Developers or manufacturers can store error data in a correlated knowledge base. This knowledge base tracks solutions to known errors, and correlates error data to find similar root causes and associate solutions across multiple knowledge base entries. This allows for users of the correlated knowledge base to more efficiently and effectively associate errors with solutions. Applications or devices which interface with the correlated knowledge base may submit their error data and query the knowledge base for an acceptable solution. The solution may be in a directly applicable knowledge base entry, or a correlated entry.

The solution is then communicated to the client device so that it may be automatically executed. If a solution is not known, an alternative action is suggested to the client. For example, the client can be solicited to call a customer support representative to discover a solution to resolve the problem, thereby satisfying the client and building the knowledge base. As another example, a refund for the sale of the application may be automatically issued. Error data can also be communicated to a developer of the application in order to expedite resolution of the error. When new solutions are added to the knowledge base, users who experienced related errors can be notified that a solution has been found for their error.

In the following discussion, a general description of the system and its components is provided, followed by a discussion of the operation of the same.

Figure 1:
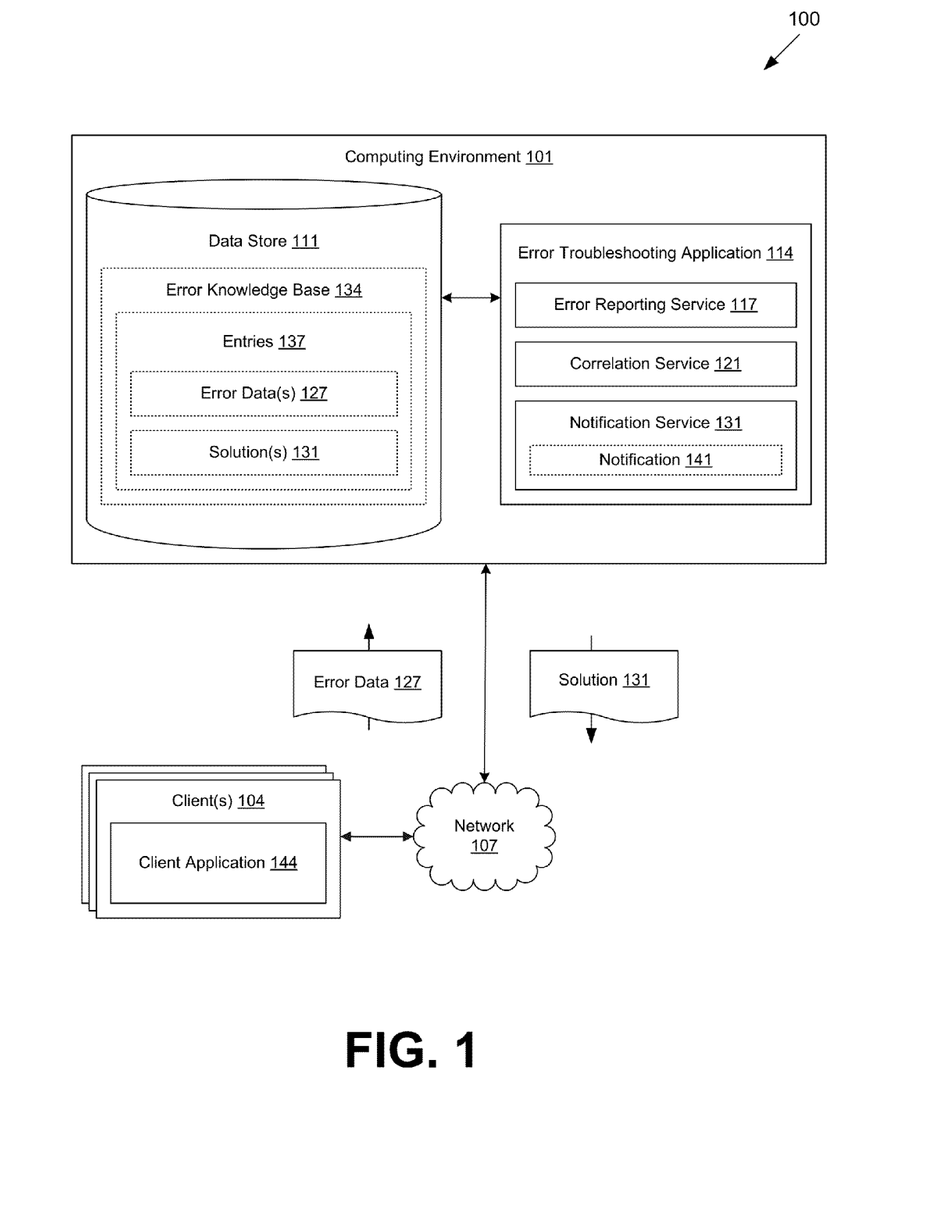
FIG. 1 is a drawing of a networked environment according to various embodiments of the present disclosure.

With reference to FIG. 1, shown is a networked environment 100 according to various embodiments. The networked environment 100 includes a computing environment 101, and a client device 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include an error troubleshooting application 114 comprising an error reporting service 117, a correlation service 121, and a notification service 124, and other applications, services, processes, systems, engines, or functionality not discussed in detail herein. The error troubleshooting application 114 is executed to facilitate the obtaining of error data 127 from and provide solutions 131 to a client 104. Error data 127 may comprise data including stack traces, execution paths, device state or contextual data, or other data. The error reporting service 117 obtains the error data 127 and queries an error knowledge base 134 to determine an appropriate solution 131, or create a new entry 137. The error reporting service 117 also facilitates the submission of solutions 131 to be associated with an entry 137 of the error knowledge base 134.

The correlation service 121 correlates entries 137 having related error data 127, thereby creating an association between at least one entry 137 and one or more other entries 137. Correlation may be performed by applying a machine learning algorithm to the entries 137, by applying a data mining algorithm to the entries 137, or by another approach.

Correlation may be based on associated application program interface calls, system parameters, stack traces, error codes, or other data. The correlation service 121 may be executed in response to a creation or update of an entry 137, at a predefined interval, in response to a user input, or at other times.

The notification service 124 facilitates communicating solutions 131 and notifications 141 to a client 104. Solutions 131 may be communicated to the client 104 to facilitate an automatic execution of the solution 131. Notifications 141 may be communicated in response to an obtained error data 127 having an associated solution 131 in an entry 137 of the error knowledge base 134. Notifications 141 may also be communicated in the event that no solution 131 can be found in the error knowledge base 134. Additionally, in the event that a solution 131 is submitted to the error knowledge base 134 for association with an entry 137, the notification service 124 may communicate a notification 141 to clients 104 associated with the updated entry 137 that a solution 131 has been added. Notifications 141 may also be sent when an entry 137 is associated with a solution 131 by being correlated by the correlation service 121 with an entry 137 comprising a solution 131. Notifications 141 may also be sent in other events.

Communicating a notification 141 to a client 104 may comprise encoding for rendering by the client 104 a user interface or popup message embodying the notification 141. Communicating a notification 141 may also comprise serving a network page, sending a short messaging system (SMS) message, sending an email message, or another approach.

Additionally, the notification service 124 can communicate error data 127, information from the knowledge base 134, or other data to developers associated with the client application 144 in order to expedite resolution of the error.

The data stored in the data store 111 includes, for example, an error knowledge base 134, and potentially other data. The error knowledge base 134 comprises at least one entry 137 associated with an error data 127. An entry 137 may also comprise a solution 131. Additionally, an entry 137 may comprise contact information relating to the client 104 which submitted the error data 127 to facilitate the notification service 124. Contact information may include a name, phone number, device identification number, email address, user id, another unique identifier, or other data. The entry 137 may also comprise other data or information. An entry 137 may also be associated with one or more other entries 137 by the correlation service 121.

The client 104 is representative of a plurality of client devices that may be coupled to the network 107 The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 144 and/or other applications. The client application 144 may be executed in a client 104 for example, to access network content served up by the computing environment 101 and/or other servers. The client application 144 may, for example, correspond to a browser, a mobile application, etc. The client 104 may be configured to execute applications beyond the client application 144 such as, for example, browsers, mobile applications, email applications, social networking applications, and/or other applications.

Next, a general description of the operation of the various components of the networked environment 100 is provided.

To begin, the error troubleshooting application 114 obtains error data 127 from a client 104 using the error reporting service 117. The error data 127 may comprise data relating to an error in execution of a client application 144, an operating system executed on the client 104, or other services, functionality, or processes. The error data 127 may comprise data including application program interface calls, device states, system properties, system usage, or other data. The error data 127 may also be tagged with metadata as can be appreciated.

The error data 127 may be obtained immediately after or contemporaneous to an error in execution. The error data 127 may also be aggregated over time and communicated to the error troubleshooting application 114 at a predefined interval, after meeting a predefined threshold of errors, after the error data 127 exceeds a predefined size threshold, in response to another event, or satisfying other criteria. The error data 127 may be constructed by intercepting application program interface calls using byte code instrumentation, assembled from logs generated by an executing client application 144, or by another approach.

After the error troubleshooting application 114 has obtained the error data 127, the error reporting service 117 queries the error knowledge base 134 for an associated solution 131. The solution 131 may be associated with the error data 127 by being included in an entry 137 of the error knowledge base 134 which comprises matching error data 127. The solution 131 may also be associated with the error data by being included in an entry 137 which has been correlated with another entry 137 comprising matching error data 127. Other approaches may also be used to determine an associated solution 131.

In some embodiments, an error data 127 may be associated with many solutions 131. In these embodiments, a preferred solution 131 may be selected as a function of some criteria, such as a customer satisfaction value, speed, simplicity, or other criteria.

In the event that an associated solution 131 cannot be obtained from the error knowledge base 134, the error reporting service 117 may also create a new entry 137 in the error knowledge base 134 for the obtained error data 127. An entry 137 may also be created by default in response to receiving any error data 127, or in response to satisfying other criteria or conditions.

Should the error reporting service 117 be unable to query the error knowledge base 134 for a solution 131, the error troubleshooting application 114 takes an alternative action with respect to the client 104. In some embodiments, the notification service 124 communicates a notification 141 to the client 104. The notification 141 may comprise a solicitation to contact a customer support representative or another party to resolve the issue, or other information. In embodiments in which the notification 141 comprises a solicitation to contact a customer support representative or another party, the notification 141 may include clickable or selectable components which initiate a phone call, begin construction of an email, or otherwise expedite and facilitate the process of contacting the desired party.

As another example of an alternative action, the error troubleshooting application 114 may automatically issue a refund associated with a sale of the client application 144. In these embodiments, the notification service 124 may communicate a notice of the refund to a developer of the client application 144. This entices the developer to fix the error or develop a solution 131 to prevent future refunds. Other alternative actions may also be taken.

In embodiments in which solutions 131 and alternative actions are associated with customer satisfaction, an alternative action may be added to the error knowledge base 134 as a preferred solution 131. For example, if issuing a refund results in greater customer satisfaction than a solution 131 which repairs an error, the act of issuing a refund may be added to the knowledge base 134 as a solution 131 selected preferentially over other solutions 131. Other criteria may also be used to include alternative actions as solutions 131.

Should the error reporting service 117 obtain a solution 131 associated with the error data 127, the notification service 124 communicates a notification 141 comprising information relating to the solution 131. The notification 141 may comprise actions or functions executable by a client 104 to resolve the problem, a reference to more detailed instructions such as a uniform resource locator (URL), or other data. In some embodiments, the notification 141 may contain links to initiate the download of an update, patch, or other component of the application or functionality which generated the error data 127.

Additionally, the solution 131 may be embodied in the notification 141 and communicated to the client 104. In these embodiments, the solution 131 may be automatically executed on the client 104. Other information or data may also be embodied in the notification 141.

To facilitate the resolution of error data 127 that, at the time they are obtained, are not associated with a solution 131, the error troubleshooting application 114 may accept submitted solutions 131 to be associated with an entry 137 of the error knowledge base 134. A solution 131 may be submitted by an authorized user of the computing environment 101 such as a customer support representative or system administrator. A solution 131 may also be submitted by a client 104 having been granted special permissions, having passed a certification or vetting process, or other clients 104. Other sources may also submit solutions 131.

In response to a solution 131 being submitted for association with an entry 137, the error reporting service 117 updates the appropriate entries 137 in the error knowledge base 134. In embodiments in which an entry 137 comprises contact information for or is otherwise associated with the client 104 that submitted the associated error data 127, the notification service 124 may communicate a notification 141 to these clients 104 indicating that a solution 131 has been associated with their error data 127.

The clients 104 to be notified may be those clients 104 who are associated with updated entry 137. The clients 104 to be notified may also be those clients 104 who are associated with entries 137 correlated with the updated entry 137 by the correlation service 121. Clients 104 to be notified may also be determined by another approach.

In some embodiments, the notification service 124 may notify those clients 104 associated with an updated entry 137 by default in the event of an update to the entry 137. In other embodiments, the notification service 124 may contact those clients 104 who have requested through a user preference, setting, or subscription service, that a notification 141 be sent in the event of an update to an associated entry 137. Other techniques may also be used to determine the clients 104 to be notified.

Additionally, in some embodiments, an error data 127 may not be associated with a solution 131 when it is obtained by the error trouble shooting application 114, but is later associated with a solution by having their associated entry 137 correlated with an entry 137 comprising a solution 131 by the correlation service 121. In this event, the notification service 124 may also notify the clients 104 associated with the entry 137 that is now correlated with an entry 137 comprising a solution 131.

Figure 2:
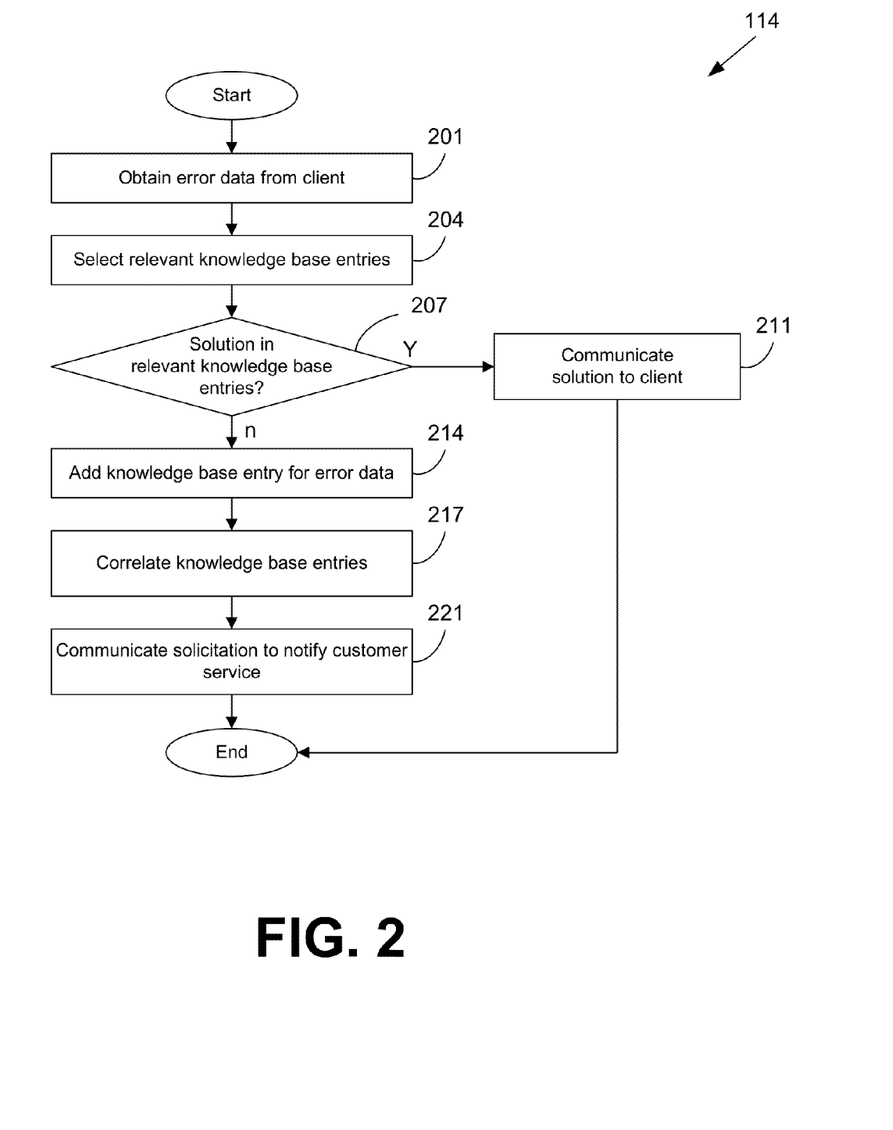
FIG. 2 is a flowchart illustrating one example of functionality implemented as portions of the error troubleshooting application executed in a computing environment in the networked environment of FIG. 1 according to various embodiments of the present disclosure.

Referring next to FIG. 2, shown is a flowchart that provides one example of the operation of a portion of the error troubleshooting application 114 (FIG. 1) according to various embodiments. It is understood that the flowchart of FIG. 2 provides merely an example of the many different types of functional arrangements that may be employed to implement the operation of the portion of the error troubleshooting application 114 as described herein. As an alternative, the flowchart of FIG. 2 may be viewed as depicting an example of steps of a method implemented in the computing environment 101 (FIG. 1) according to one or more embodiments.

Beginning with box 201, the error troubleshooting application 114 obtains error data 127 (FIG. 1) from a client 104 (FIG. 1). The error data 127 may be obtained from a client 104 immediately after or contemporaneous to an error in execution of a client application 144 (FIG. 1), operating system, or other function or service. The error data 127 may also be obtained after the client 104 aggregates error data 127 for a predetermined period of time, after satisfying a predefined condition, or by another approach. The error data 127 may comprise information relating to application program interface calls, stack traces, device or system profiles, or other data. The error data 127 may also comprise other metadata as can be appreciated.

Next, in box 204, the error troubleshooting application 114 selects entries 137 (FIG. 1) from the error knowledge base 134 (FIG. 1) that are relevant to the obtained error data 127. This may be facilitated by the error reporting service 117 (FIG. 1). Relevant entries 137 (FIG. 1) may comprise those entries 137 whose associated error data 127 matches at least a portion of the data or meta data of the obtained error data 127. Relevant entries 137 may also comprise those entries 137 who are correlated with an associated entry 137 by the correlation service 121 (FIG. 1). Other criteria or approaches may also be used to determine the relevant entries 137 of the error knowledge base 134.

In box 207, the error troubleshooting application 114 determines if any of the relevant entries 137 comprises a solution 131 (FIG. 1). If one of the relevant entries comprises a solution 131, the notification service 124 (FIG. 1) communicates the solution 131 to the client 104 in box 211. In one embodiment, communicating the solution 131 may comprise encoding for rendering by the client 104 a popup embodying the solution 131. In other embodiments, communicating the solution 131 may comprise inserting code or data into a network page served to the client 104. In further embodiments, communicating the solution 131 may comprise sending an email or SMS message. Other approaches may also be used to communicate the solution 131 to the client 104.

If none of the relevant entries 137 comprises a solution 131, the error troubleshooting application 114 adds an entry 137 to the knowledge base 134 corresponding to the obtained error data 127 in box 214. The created entry 137 may comprise the obtained error data 127, metadata generated by the error troubleshooting application 114, contact information or unique identifiers indicating the client 104 from which the error data 127 was obtained, or other data.

In box 217, after the new entry 137 has been added to the knowledge base 134, the correlation service 121 (FIG. 1) of the error troubleshooting application 114 correlates the entries 137 of the error knowledge base 134. In some embodiments, correlating the entries 137 of the error knowledge base 134 may comprise applying a machine learning algorithm to the entries 137. In embodiments in which a machine learning algorithm is applied to the entries 137, the machine learning algorithm may comprise an unsupervised data mining algorithm. In other embodiments, the machine learning algorithm may comprise a supervised machine learning algorithm applied to the entries 137 and input from a user of the computing environment 101. Other approaches may also be used to correlate the entries 137 of the error knowledge base 134.

In box 221, the notification service 124 of the error troubleshooting application 114 communicates a solicitation to call customer support to the client 104. Communicating a solicitation may comprise encoding for rendering on the client 104 a popup. In such embodiments, the popup may comprise a button or other clickable user interface element which initiates a phone call on a device with capable functionality. Communicating a solicitation may also comprise sending an SMS message or sending an email. In some embodiments, communicating a solicitation may comprise encoding a user interface or user interface elements for rendering by a client application 144 (FIG. 1). Other approaches may also be used to communicate the solicitation to call customer support to the client 104. After communicating the solicitation to the client 104, the process ends.

Figure 3:
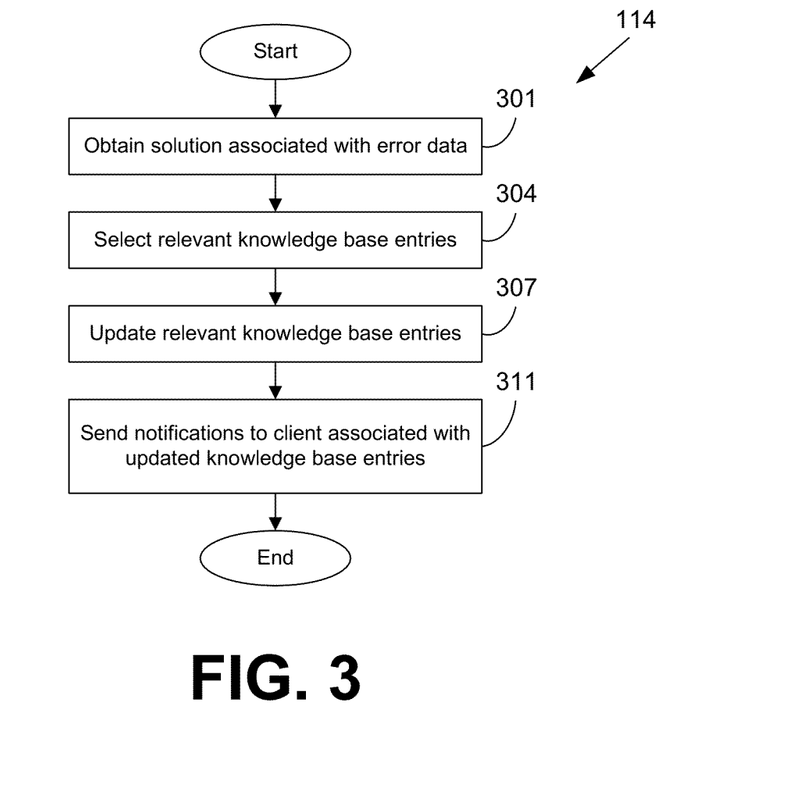
FIG. 3 is a flowchart illustrating one example of functionality implemented as portions of the updating functionality of the error troubleshooting application executed in a computing environment in the networked environment of FIG. 1 according to various embodiments of the present disclosure.

Moving on to FIG. 3, shown is a flowchart that provides one example of the operation of a solution submission portion of the error troubleshooting application 114 (FIG. 1) according to various embodiments. It is understood that the flowchart of FIG. 3 provides merely an example of the many different types of functional arrangements that may be employed to implement the operation of the portion of the error troubleshooting application 114 as described herein. As an alternative, the flowchart of FIG. 3 may be viewed as depicting an example of steps of a method implemented in the computing environment 101 (FIG. 1) according to one or more embodiments.

Beginning with box 301, the error troubleshooting application 114 obtains a solution 131 (FIG. 1) associated with error data 127 (FIG. 1). The solution 131 may be obtained as input from an authorized user of the computing environment 101 such as a customer support representative, system administrator, or other user. The solution 131 may also be obtained from clients 104 (FIG. 1) with appropriate permissions to submit solutions. Other approaches may also be used to obtain the solution 131. Other data may also be obtained contemporaneous with the solution 131, such as unique identifiers indicating the entries 137 (FIG. 1) or error data 127 to which the solution 131 applies.

Next, in box 304, the error troubleshooting application 114 selects the entries 137 (FIG. 1) of the error knowledge base 134 (FIG. 1) relevant to the error data 127. In some embodiments, selecting the relevant entries 137 comprises selecting those entries 137 with matching error data 127. In embodiments in which the solution 131 is obtained contemporaneous to unique identifiers indicating those entries 137 or error data 127 to which the solution 131 applies, selecting the relevant entries 137 comprises selecting those entries 137 matching the unique identifiers.

In other embodiments, selecting the relevant entries 137 further comprises selecting those entries 137 who have been correlated by the correlation service 121 (FIG. 1) with relevant entries 137. Other approaches may also be used to select the relevant entries 137 of the error knowledge base 134.

Next, in box 307, the error reporting service 117 (FIG. 1) of the error troubleshooting application 114 updates relevant entries 137 of the error knowledge base 134 to further embody the obtained solution 131. Updating the relevant entries 137 may comprise updating the entirety of the relevant entries 137 or a subset of the relevant entries 137. For example, in embodiments in which the relevant entries 137 comprises entries 137 selected by a unique identifier and correlated entries 137, the error reporting service 117 may only update the uniquely identified entries 137. Other approaches may also be used to update the relevant entries 137.

Next, in box 311, the notification service 124 (FIG. 1) communicates a notification 141 (FIG. 1) to the clients 104 associated with the updated entries 137 of the knowledge base 134. In some embodiments, this may comprise communicating a notification 141 to all associated clients 104. In other embodiments, this may comprise communicating a notification 141 to those clients 104 who have requested that they receive a notification 141 in a user preference. In further embodiments, this may comprise communicating a notification 141 to all clients 104 except those who have requested that notifications 141 not be sent to the client 104. Other techniques may also be used to determine which clients 104 are communicated the notification 141.

The communicating the notification 141 may comprise sending an email, sending an SMS message, encoding data in a network page served to the client 104, or another approach. After communicating the notification 141 to the client 104, the process ends.

Figure 4A:
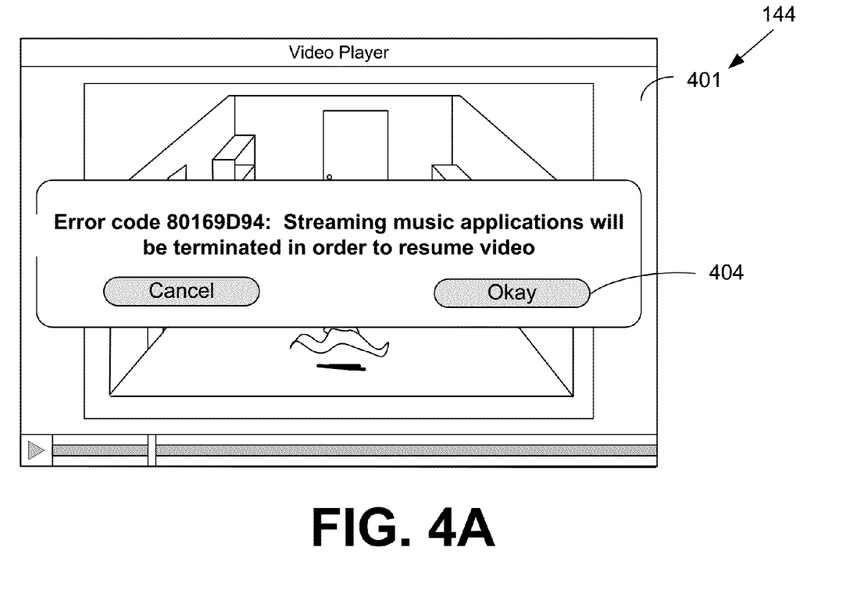
FIG. 4 is a drawing of an example of a user interface rendered by a client in the networked environment of FIG. 1 according to various embodiments of the present disclosure.

Moving on to FIG. 4A, shown is a nonlimiting example of a user interface communicating a notification 141 (FIG. 1) embodying a solution 131 (FIG. 1) as rendered on a client 104 (FIG. 1). Item 401 shows an example user interface for a video player executed on a client 104 as a client application 144 (FIG. 1). The example video player has encountered an error in execution. The error troubleshooting application 114 (FIG. 1) has successfully found a solution 131 in an entry 137 (FIG. 1) of the error knowledge base 134 (FIG. 1). Item 404 shows a popup window communicated by the notification service 124 (FIG. 1) of the error troubleshooting application 114 embodying the solution 131. The popup window indicates that streaming music applications will be terminated so that the video player may resume streaming video. The user is presented with a "Cancel" option, to dismiss the notification, and an "Okay" button to execute the solution on the device. Item 404 further comprises a button which will dismiss the popup upon clicking.

Figure 4B:
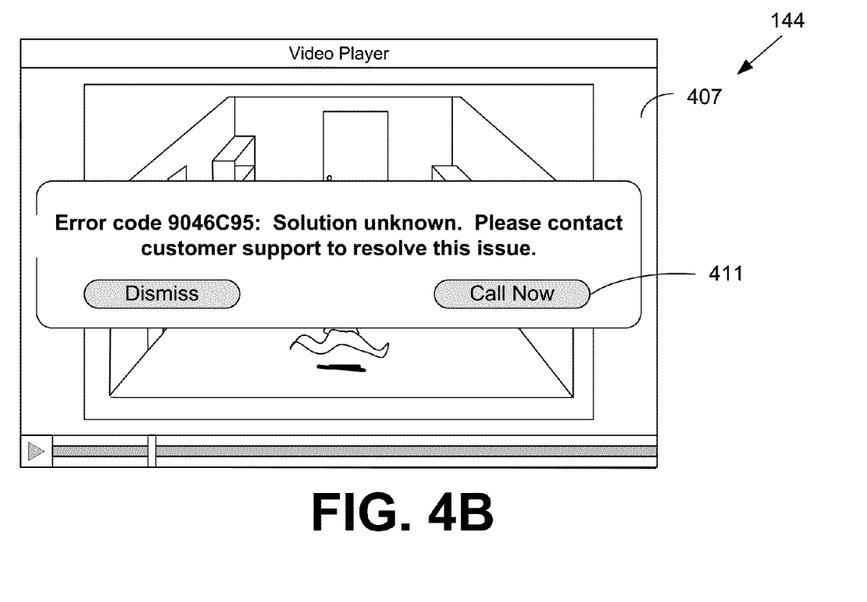

Next, in FIG. 4B, shown is a nonlimiting example of a user interface communicating a notification 141 (FIG. 1) embodying a solicitation as rendered on a client 104 (FIG. 1). In this example, the client 104 comprises a device capable of making phone calls. Item 407 represents a video player as a client application 144 (FIG. 1) executed on the client 104. The video player has encountered an error in execution. The error troubleshooting application 114 (FIG. 1) did not find a solution 131 (FIG. 1) in the error knowledge base 134 (FIG. 1). The notification service 124 (FIG. 1) has communicated a notification 141 (FIG. 1) as a popup 411 comprising a solicitation to contact customer support. The popup 411 further comprises a "Dismiss" button to close the popup 411, and a "Call Now" button which, upon clicking, will initiate a phone call between the client 104 and a customer support representative.

Figure 5:
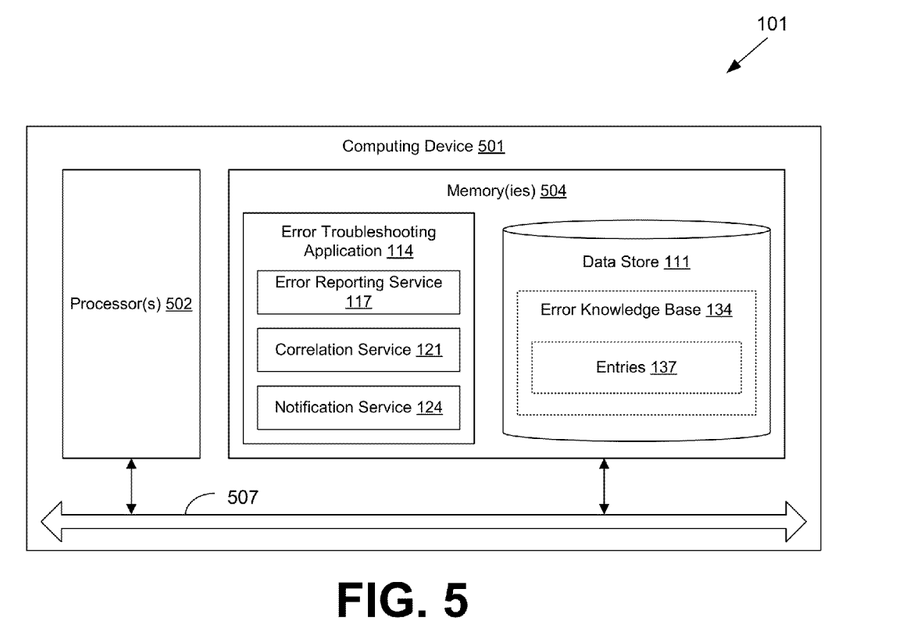
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 101 according to an embodiment of the present disclosure. The computing environment 101 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are the error troubleshooting application 114 (FIG. 1) having the error reporting service 117 (FIG. 1), the correlation service 121 (FIG. 1), and the notification service 124 (FIG. 1), and potentially other applications. Also stored in the memory 504 may be a data store 111 (FIG. 1) having an error knowledge base 134 (FIG. 1) comprising entries 137 (FIG. 1) and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the error troubleshooting application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the error troubleshooting application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the error troubleshooting application 114, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
   code that obtains error data associated with an execution of an application from a first one of a plurality of client devices;
   code that adds an error knowledge base entry based at least in part on the error data to a plurality of error knowledge base entries;
   code that selects a pool of relevant entries from the error knowledge base entries based on the error data;
   code that, responsive to the pool comprising no relevant entries, performs an alternative action associated with the first one of the client devices;
   code that, responsive to the pool comprising at least one relevant entry, determines a first solution associated with the error data based on the at least one relevant entry;
   code that communicates the first solution to the first one of the client devices to facilitate an automatic execution of the solution on the first one of the client devices;
   code that obtains, from a second one of the client devices, a second solution associated with at least one error without a solution indicated in the plurality of knowledge base entries; and
   code that updates at least one of the error knowledge base entries associated with the at least one error without a solution to reflect the second solution; and
   code that, in response to the at least one of the error knowledge base entries transitioning to reflecting the second solution, communicates a message to at least one of the client devices having previously indicated the at least one error, the message indicating the second solution.

2. The non-transitory computer-readable medium of claim 1, wherein the code that performs the alternative action comprises code that issues an automatic issuance of a refund associated with a purchase of the application in response to the pool of entries from the error knowledge base entries comprising no relevant entries.

3. The non-transitory computer-readable medium of claim 1, wherein the code that performs the alternative action comprises code that communicates a solicitation to contact a customer support representative in response to the pool of entries from the error knowledge base entries comprising no relevant entries.

4. A system, comprising:
   at least one computing device;
   an error knowledge base comprising at least one entry; and
   an error troubleshooting application executable in the at least one computing device, the error troubleshooting application comprising:
     logic that obtains error data from a mobile client device;
     logic that determines whether the error data is associated with a solution indicated in the error knowledge base;
     logic that, responsive to the error data being associated with the solution indicated in the error knowledge base, communicates a first notification and the solution to the mobile client device to facilitate an automatic execution of the solution on the mobile client device;
     logic that, responsive to the error data not being associated with the solution indicated in the error knowledge base, performs an alternative action associated with the mobile client device;
     logic that, responsive to the error data transitioning from not being associated with the solution to being associated with the solution, communicates a notification indicating the solution to one or more of the mobile client devices associated with the error data; and
     wherein the error data is associated with an execution of an application on the mobile client device.

5. The system of claim 4, wherein the logic that performs the alternative action comprises logic that communicates, responsive to the error data not being associated with the solution indicated in the error knowledge base, a solicitation to the mobile client device to contact a customer support representative.

6. The system of claim 4, wherein the logic that performs the alternative action comprises logic that performs, responsive to the error data not being associated with the solution indicated in the error knowledge base, an automatic issuance of a refund associated with a sale of the application.

7. The system of claim 4, wherein the error data further comprises contextual data associated with a state of the mobile client device at a time of an error, and the error troubleshooting application further comprises logic that generates the solution from the contextual data.

8. The system of claim 7, wherein the logic that generates the solution from the contextual data further comprises logic that verifies the solution on a test mobile client device.

9. The system of claim 4, wherein the error troubleshooting application further comprises logic that determines a plurality of correlated entries from the at least one entry.

10. The system of claim 9, wherein the entry is one of a plurality of entries, and wherein the logic that determines the correlated entries comprises applying a machine learning algorithm to the entries.

11. The system of claim 9, wherein the mobile client device is one of a plurality of mobile client devices, the solution is one of a plurality of solutions, and the error troubleshooting application further comprises logic that communicates a message to at least one of the mobile client devices associated with a first one of the correlated entries indicating one of the solutions associated with a second one of the correlated entries.

12. The system of claim 4, wherein the mobile client device is one of a plurality of mobile client devices, and error troubleshooting application further comprises:

logic that obtains the solution from one of the mobile client devices; and logic that, after obtaining the solution, updates the knowledge base to associate the solution with the error data in the knowledge base.

13. A method, comprising:

obtaining, in a computing device, an error data from a client device executing a streaming media application;

selecting, in the computing device, a pool of relevant entries from a plurality of error knowledge base entries;

determining, in the computing device, based at least in part on the relevant entries, if the error data is associated with a solution indicated in the pool of relevant entries;

encoding for rendering, in the computing device, responsive to the error data being associated with the solution indicated in the pool of relevant entries, a graphical user interface element facilitating an automatic execution of the solution on the client device;

communicating, in the computing device, the graphical user interface element to the client device;

taking, in the computing device, responsive to the error data not being associated with the solution indicated in the pool of relevant entries or responsive to the pool of relevant entries comprising an empty set, an alternative action associated with the client device; and communicating, responsive to the error data transitioning from not being associated with the solution to being associated with the solution, communicates a notification indicating the solution to the client device.

14. The method of claim 13, wherein the alternative action comprises communicating a solicitation to the client device indicating a need to contact a customer support representative.

15. The method of claim 13, further comprising communicating, in the computing device, a notification of an error associated with the error data to a developer associated with the streaming media application.

16. The method of claim 15, wherein the notification further comprises device state data associated with the error knowledge base entries.

17. The method of claim 13, wherein the solution is one of a plurality of solutions and the error data is associated with the plurality of solutions, and the method further comprises the step of selecting a preferred solution from the plurality of solutions.

18. The method of claim 17, wherein selecting the preferred solution is based at least in part on a customer satisfaction value.

19. The method of claim 13, further comprising executing, in the computing device, a correlation of the error knowledge base entries, and wherein the selecting the relevant entries is further based on the correlation.

20. The method of claim 13, wherein the client device is one of a plurality of client devices, the solution is one of a plurality of solutions, and the method further comprises:

obtaining, in the computing device, one of the solutions from one of the client devices; and associating, in the computing device, the one of the solutions with at least one of the error knowledge base entries.

21. The method of claim 20, further comprising the step of communicating, in the computing device, a message indicating the one of the solutions to at least one of the client devices associated with the knowledge base entries.

22. The method of claim 21, wherein the message further comprises a short message service (SMS) message.

23. The method of claim 13, wherein the error data further comprises contextual data associated with a state of the mobile client device at a time of an error, and the method further comprises generating the solution from the contextual data.

* * * * *